(12) United States Patent
Morales et al.

(10) Patent No.: US 9,249,931 B2
(45) Date of Patent: Feb. 2, 2016

(54) FLUID STORAGE TANK

(71) Applicant: GM GLOBAL TECHNOLOGY OPERATIONS LLC, Detroit, MI (US)

(72) Inventors: Arianna T. Morales, Royal Oak, MI (US); Mei Cai, Bloomfield Hills, MI (US); Anne M. Dailly, West Bloomfield, MI (US); Mahmoud H. Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/974,743

(22) Filed: Aug. 23, 2013

(65) Prior Publication Data

US 2014/0291331 A1  Oct. 2, 2014

Related U.S. Application Data

(60) Provisional application No. 61/806,062, filed on Mar. 28, 2013.

(51) Int. Cl.
*F17C 1/14* (2006.01)
*F17C 1/16* (2006.01)
*F17C 3/00* (2006.01)

(52) U.S. Cl.
CPC ... *F17C 1/14* (2013.01); *F17C 1/16* (2013.01); *F17C 3/00* (2013.01); *F17C 2201/0109* (2013.01); *F17C 2201/0128* (2013.01); *F17C 2201/0157* (2013.01); *F17C 2201/0166* (2013.01); *F17C 2201/0171* (2013.01); *F17C 2201/056* (2013.01); *F17C 2201/06* (2013.01); *F17C 2203/066* (2013.01); *F17C 2203/0617* (2013.01); *F17C 2203/0636* (2013.01); *F17C 2203/0639* (2013.01); *F17C 2203/0643* (2013.01); *F17C 2203/0646* (2013.01); *F17C 2203/0663* (2013.01); *F17C 2205/0134* (2013.01); *F17C 2209/219* (2013.01); *F17C 2209/2181* (2013.01); *F17C 2221/012* (2013.01);

(Continued)

(58) Field of Classification Search
CPC ............ F17C 1/00; F17C 1/002; F17C 1/005; F17C 3/00; F17C 2201/00; F17C 2201/01; F17C 2201/0147; F17C 2201/0166; F17C 2201/0171
USPC ......... 137/255, 259, 263, 266; 220/23.2, 500, 220/501, 564, 567.2, 581, 584, 586
See application file for complete search history.

(56) References Cited

U.S. PATENT DOCUMENTS 2,850,083 A  9/1958  Frost
4,878,591 A  11/1989  Johnston (Continued)

FOREIGN PATENT DOCUMENTS

EP  0 633 422 A1  1/1995

*Primary Examiner* — Steven A. Reynolds
*Assistant Examiner* — Javier A Pagan
(74) *Attorney, Agent, or Firm* — Dierker & Associates, P.C.

(57) ABSTRACT

A fluid storage tank includes a plurality of tank sub-units disposed in an array. Each tank sub-unit of the plurality of tank sub-units has an aperture defined in at least one wall overlapping with another aperture defined in at least one adjacent tank sub-unit of the plurality of tank sub-units. Each tank sub-unit of the plurality of tank sub-units is in fluid communication with a single outlet port for selectively extracting a stored fluid from the tank. Each of the plurality of tank sub-units is in fluid communication with a single fluid fill port.

16 Claims, 4 Drawing Sheets

(52) U.S. Cl.
CPC ..... *F17C 2221/013* (2013.01); *F17C 2221/014* (2013.01); *F17C 2221/015* (2013.01); *F17C 2221/033* (2013.01); *F17C 2221/035* (2013.01); *F17C 2223/0123* (2013.01); *F17C 2223/0161* (2013.01); *F17C 2223/033* (2013.01); *F17C 2223/035* (2013.01); *F17C 2223/036* (2013.01); *F17C 2260/018* (2013.01); *F17C 2270/0105* (2013.01); *F17C 2270/0131* (2013.01); *F17C 2270/0165* (2013.01); *F17C 2270/0168* (2013.01); *F17C 2270/0171* (2013.01); *F17C 2270/0173* (2013.01); *F17C 2270/0178* (2013.01); *F17C 2270/0189* (2013.01); *F17C 2270/0197* (2013.01); *Y02E 60/321* (2013.01)

(56) References Cited

U.S. PATENT DOCUMENTS 5,577,630 A * 11/1996 Blair et al. ............... 220/581
8,100,151 B2 * 1/2012 Handa ....................... 141/82

* cited by examiner

FLUID STORAGE TANK

CROSS-REFERENCE TO RELATED APPLICATIONS

This application claims the benefit of U.S. Provisional Application Ser. No. 61/806,062, filed Mar. 28, 2013, which is incorporated by reference herein in its entirety.

BACKGROUND

Fluid storage tanks are used to contain a fluid for a period of time. A fluid may include a gas, a liquid or combinations thereof. Some fluid storage tanks are pressure vessels. Pressure vessels, such as, e.g., gas storage containers and hydraulic accumulators may be used to contain fluids under pressure. It may be desirable to have a pressure vessel with relatively thin walls and low weight. For example, in a vehicle fuel tank, relatively thin walls allow for more efficient use of available space, and relatively low weight allows for movement of the vehicle with greater energy efficiency.

SUMMARY

A fluid storage tank includes a plurality of tank sub-units disposed in an array. Each tank sub-unit of the plurality of tank sub-units has an aperture defined in at least one wall overlapping with another aperture defined in at least one adjacent tank sub-unit of the plurality of tank sub-units. Each tank sub-unit of the plurality of tank sub-units is in fluid communication with a single outlet port for selectively extracting a stored fluid from the tank. Each tank sub-unit of the plurality of tank sub-units is in fluid communication with a single fluid fill port.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
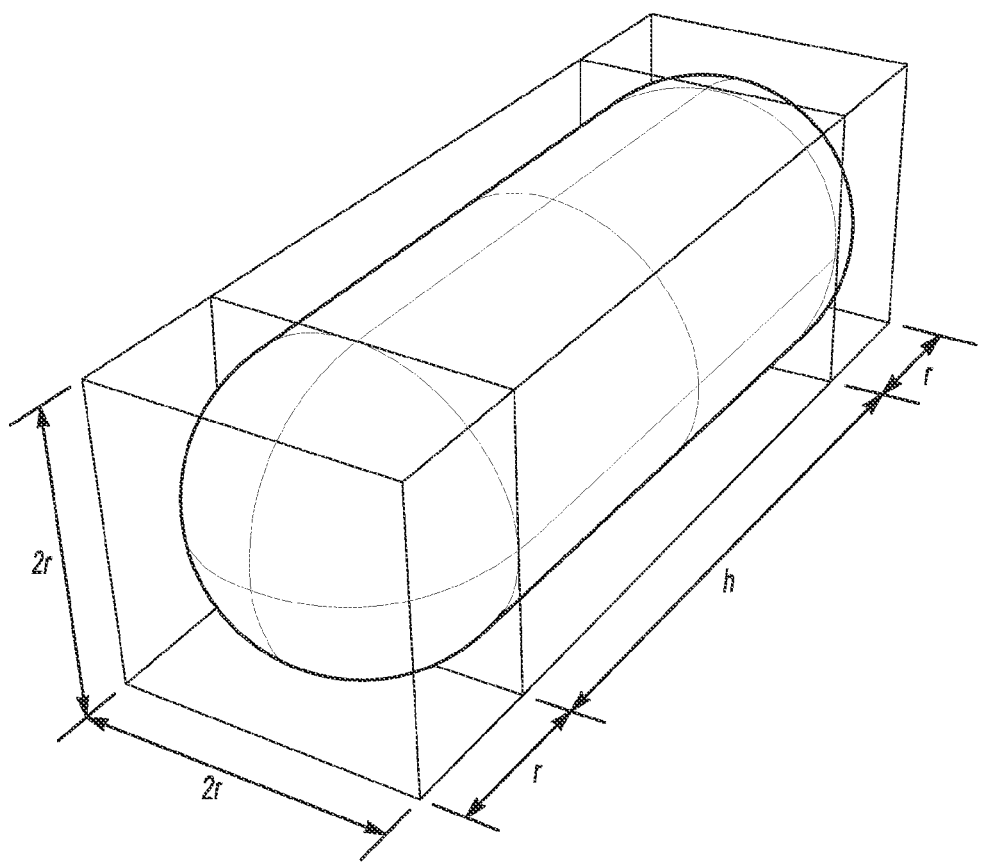
FIG. 1 is a perspective view of a cylindrical tank with hemispherical ends and an enclosing rectangular cuboid with dimensions shown for use in an example calculation of a conformability factor.

Some vehicles carry fluid storage tanks. The fluid storage tanks may store fluid for consumption by the vehicle itself. For example, liquid or gaseous fuel may be consumed by the vehicle. Some vehicles transport fluid from place to place in tanks that are carried on-board. For example, a tanker truck may transport gas to a station for retail sale. As used herein, a vehicle is a movable device for transporting people or materials on land, in air, in water, or through space. Examples of vehicles include automobiles, trucks, motorcycles, carts, wagons, trains, aircraft, missiles, ships, boats, submarines, and spaceships. When vehicles are accelerated or decelerated, energy is typically consumed. A light weight fluid tank may cause the vehicle to use less energy to move the tank than a heavier tank.

Examples of fluid storage tanks according to the present disclosure may contain liquids, gases, or combinations thereof. A liquid may be stored without pressure over the liquid if the fluid storage tank is vented. In an example of the present disclosure, a liquid may have vapor pressure exerted on the liquid. In another example, the liquid in a storage tank may be pressurized to a pressure greater than the vapor pressure. Still further, a vacuum may be formed in a fluid storage tank of the present disclosure. In some examples of the present disclosure, the liquid storage tank may store a gas. The gas may be stored at any pressure. For example, the gas may be stored at a pressure less than, equal to, or greater than pressure surrounding the liquid storage tank. In some examples, the fluid storage tank may have atmospheric pressure exerted on the exterior of the tank. In some fluid storage tanks, external pressure exerted on the tank may be relatively high (e.g., when the tank is deeply submerged in water). Other fluid storage tanks may be exposed to external vacuum (e.g., at high altitudes).

Natural gas vehicles are fitted with on-board storage tanks Some natural gas storage tanks are designated low pressure systems, and these systems are rated for substantially lower pressures when compared to natural gas storage tanks rated at 3,600 psi (pounds per square inch) (248 bar). In an example of the present disclosure, the low pressure system may be rated for pressure of about 750 psi (52 bar) and lower. During fueling, the container of the low pressure system storage tank is designed to fill until the tank achieves a pressure within the rated range. Low pressure systems may utilize adsorbed natural gas, where a natural gas adsorbent is loaded into a container of the low pressure system storage tank. The adsorbent increases the storage capacity so that the tank is capable of storing and delivering a sufficient amount of natural gas for desired vehicle operation when filled to the lower pressures. As an example, at about 725 psi (50 bar), a vehicle including a 0.1 m$^3$ (100 L) natural gas tank filled with a suitable amount of a carbon adsorbent having a BET (Brunauer-Emmett-Teller) surface area of about 1000 m$^2$/g, a bulk density of 0.5 g/cm$^3$, and a total adsorption of 0.13 g/g is expected to have 2.85 GGE (gasoline gallon equivalent) (i.e., about 85 miles, assuming 30 mpg (miles per gallon)).

It is believed that the adsorption effect of the quantity of adsorbent in examples disclosed herein is high enough to compensate for any loss in storage capacity due to the skeleton of the adsorbent occupying volume in the container. It is further believed that the surface area of the adsorbent is such that the adsorbent will improve the container's storage capacity of compressed natural gas at lower pressures (compared, for example, to the same type of container that does not include the adsorbent), while also maintaining or improving the container's storage capacity at higher pressures. It is desirable to store at 725 psi the same amount of natural gas that can be stored in a compressed natural gas tank at 3,600 psi. Examples disclosed herein work to achieve this goal.

Examples of the present disclosure, having the adsorbent included in the tank, may store the target amount of natural gas at lower pressure than a tank without adsorbent that stores the same amount of natural gas. Natural gas stored at lower pressure may be stored in lighter weight tanks than the tanks previously used to store the target amount of natural gas at higher pressures. At lower pressures, pressure-generated stresses on the tank structure are lower. High pressure tanks are often formed in classic shapes (e.g., cylinders and spheres) that minimize stresses on the walls of the container. In examples of the present disclosure, tank shapes may be optimized to fit within the available vehicle package space without having thick walls to manage pressure-induced stress.

Tanks according to examples of the present disclosure may be conformable tanks. As used herein, "conformable" means the tank efficiently uses available space defined by a surface. The available space may be an irregular space, having pockets extending from a main space. For example, a body panel inner surface, or a floor surface of a vehicle that defines the space available for a tank may be curved for aesthetic appeal, structural stiffness, or other reasons. Struts, bosses, ridges, and other structural shapes may be formed into the body panel. In some cases, a classic cylindrical pressurized gas tank may not efficiently use space adjacent to such shapes. An example conformable tank of the present disclosure may fit within the shape of the body panel or floor that defines the available space with a minimum of unused space. As such, examples of the conformable tanks of the present disclosure use space more efficiently than a classic cylindrical pressurized gas tank. A single cylindrical tank is not considered a conformable tank in the present disclosure, even if the space available is cylindrical, for example, in a rocket. As used herein, conformable does not mean that the tank is elastic, resiliently taking the available shape like a rubber balloon inflated in a box.

Conformability of tanks may be compared by determining a conformability factor. As used herein, conformability factor means a ratio of an outer tank volume divided by an enclosing rectangular cuboid volume. For example, the conformability of the cylindrical tank shown in FIG. 1 may be calculated as follows:

$$V_{tank} = \frac{4}{3}\pi r^3 + \pi r^2 h$$

$$V_{cuboid} = (2r)^2 * (2r + h)$$

$$\text{Conformability} = \frac{V_{tank}}{V_{cuboid}} * 100\%$$

In an example, let h=37.25 inch; and r=8.1 inch. Conformability=67%

If the tank depicted in FIG. 1 has 0.5 inch (1.27 cm) thick steel walls and the dimensions r and h given above, the tank would weigh about 257 lbs (117 kg) and have an internal volume of about 93 liters. In certain tank shapes, for example a sphere (conformability factor=52%) or a right circular cylinder (conformability factor=78%), the conformability factor is independent of the actual dimensions of the tank. The conformability factor for a cylindrical tank with hemispherical ends tends to be independent of size when h is much larger than 2r.

The space available for a natural gas tank may be, for example, in a vehicle cargo storage area or trunk. As such, space occupied by the natural gas tank is not available for cargo in the vehicle. Therefore, efficient use of space by a natural gas tank may be desirable.

One standard for measuring usable cargo space in a vehicle may be found in SAE J1100, Revised September 2005, Section 7, Cargo Dimensions and Cargo Volume Indices. SAE J1100 calls for luggage capacity to be determined by fitting a number of standard luggage pieces into the luggage space. As such, some "unusable" space will remain between the standard luggage pieces and the curved surfaces of the inner body panels that define the luggage space. Other space may be determined to be unusable for luggage if one of the standard luggage pieces will not fit in the space. Examples of the present disclosure may efficiently use available space for tanks to minimize the effect of the tank on luggage capacity. Other examples of the present disclosure may efficiently use available space for tanks to make space available for other purposes.

Figure 2:
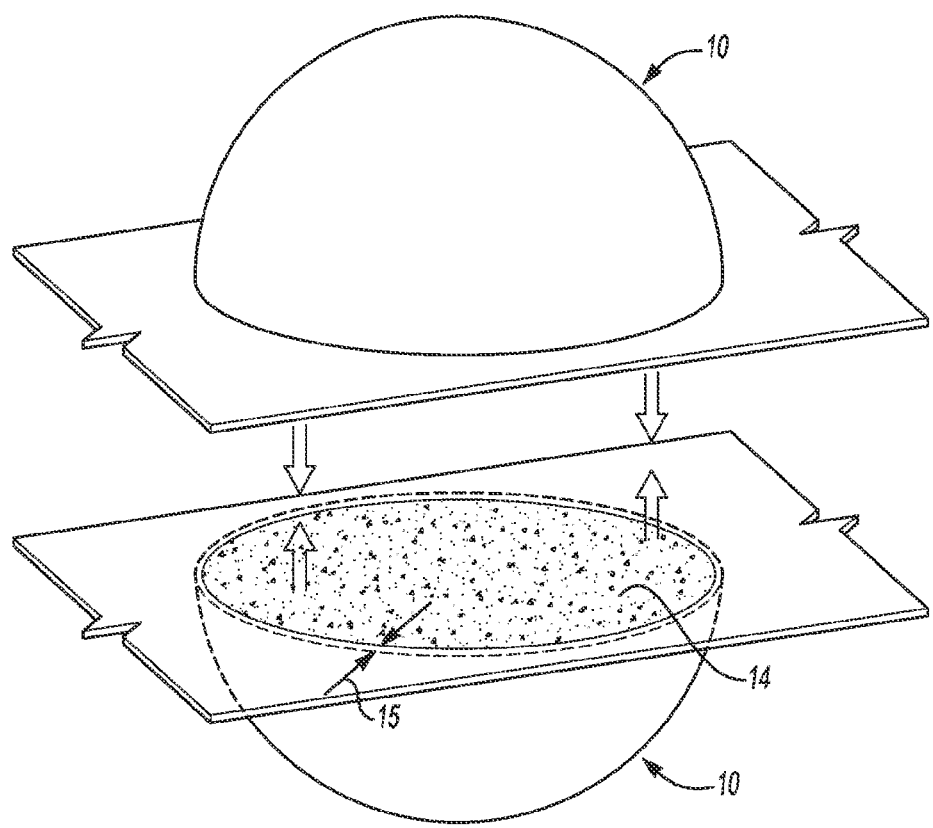
FIG. 2 is a perspective view of two halves of an individual tank sub-unit before the halves are joined to form the individual tank sub-unit according to an example of the present disclosure.
Figure 3:
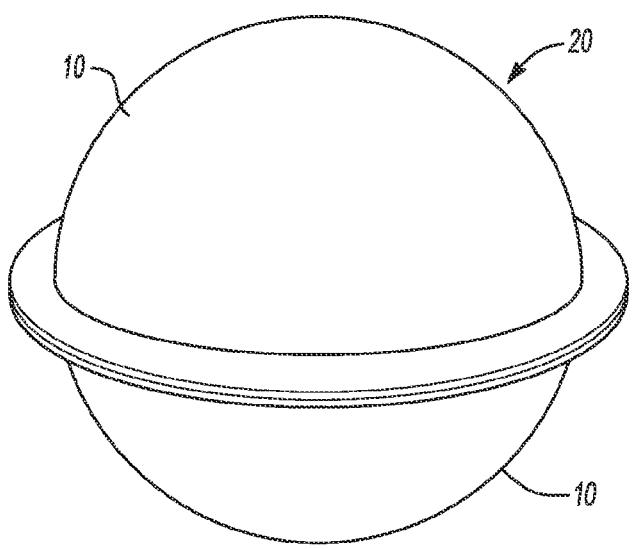
FIG. 3 is a perspective view of an individual tank sub-unit formed from the two halves depicted in FIG. 2.

FIG. 2 depicts two halves 10 of a tank sub-unit 20 according to the present disclosure. A natural gas adsorbent 14 is shown in the lower half 10 of FIG. 2, however, it is to be understood that examples of the present disclosure may omit the natural gas adsorbent 14. The natural gas adsorbent 14 may be disposed in any position in a tank sub-unit in examples of the present disclosure. Each half 10 may be formed using any suitable forming method. Examples of suitable forming methods may include superplastic forming, quick plastic forming, cold forming, blow forming, hydroforming, and high velocity forming. Some examples of high velocity forming include electrohydraulic forming, blow forming, and explosive forming. The tank sub-unit 20 may be formed from a metal, a polymer, a fiber-reinforced composite, or combinations thereof. FIG. 3 depicts the two halves 10 of FIG. 2 joined to form a tank sub-unit 20.

In an example, each tank sub-unit 20 has an internal volume ranging from about 0.2 liter to about 3.0 liters. Smaller and larger tank sub-units 20 may be used according to examples of the present disclosure. Since wall thickness 15 (see FIG. 2) is generally not less than 1 mm, a tank made from a plurality of smaller tank sub-units 20 will tend to have a higher weight compared to a tank of the same capacity made from larger tank sub-units of the same material as the smaller tank sub-units. For manufacturing efficiency, the tank sub-units 20 in a tank may have substantially the same shape, and exterior size. In another example, tank sub-units 20 of several sizes, shapes and weights may be combined to form a tank.

Figure 4:
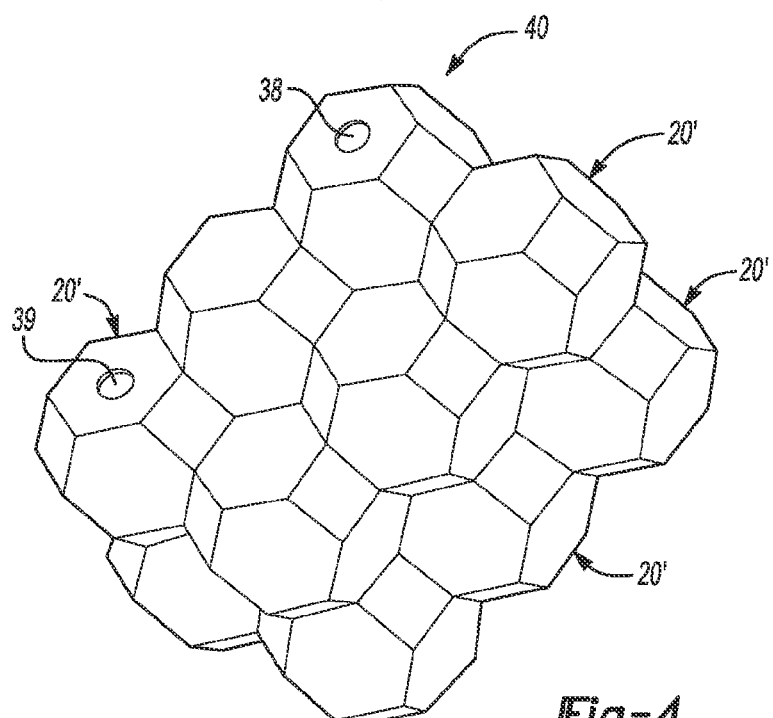
FIG. 4 is a perspective view of an array of truncated octahedron tank sub-units according to another example of the present disclosure.

Referring to FIG. 4, a fluid storage tank of an example of the present disclosure may include a plurality of tank sub-units 20' arranged to efficiently use the space available. In an example, a plurality of the tank sub-units 20' may be disposed in an array 40. A natural gas adsorbent 14 may, in an example, be disposed in each tank sub-unit 20' of the plurality of tank sub-units 20' in the array 40. Each tank sub-unit 20' is in fluid communication (directly, or indirectly through one or more adjacent tank sub-units) with a single outlet port 38. Each tank sub-unit 20' is also in fluid communication (directly, or indirectly through one or more adjacent tank sub-units) with a single fluid fill port 39. In an example, the single outlet port 38 is the single fluid inlet port 39. In other words, the functions of the single outlet port 38 and the single fluid inlet port 39 may be combined in a single inlet/outlet port. It is to be understood that the fluid communication described with respect to tank sub-unit 20' in FIGS. 4 and 5 also applies to any tank sub-unit of examples of the present disclosure, including, e.g., tank sub-units 20 and 20".

Examples of the present disclosure may be connected to a dedicated natural gas fueled engine, or to a bi-fuel engine (not shown) that is selectively capable of using liquid fuel and natural gas fuel. The engine may be used, for example, to power the vehicle in a conventional powertrain, a hybrid electric powertrain, or a battery electric powered vehicle with the engine used to extend the range of the batteries.

In an example, each tank sub-unit 20', 20" may be a primary parallelohedron. As such, the tank sub-units 20', 20" may tessellate a 3-dimensional space. A uniform tessellation which fills three-dimensional Euclidean space with non-overlapping convex uniform polyhedral tank sub-units is also known as a convex uniform honeycomb. A honeycomb having all sub-units identical within its symmetries is isochoric. A sub-unit of an isochoric honeycomb is a space-filling polyhedron. Examples of space-filling polyhedra include: regular packings of cubes, hexagonal prisms, and triangular prisms; a uniform gyrated triangular prismatic honeycomb; a uniform packing of truncated octahedra; a rhombic dodecahedral honeycomb; a triakis truncated tetrahedral honeycomb; a trapezo-rhombic dodecahedral honeycomb; an elongated dodecahedron honeycomb; and a packing of any cuboid, rhombic hexahedron or parallelepiped.

As shown in FIG. 4, there is no unused space between adjacent tank sub-units 20' that are primary parallelohedra. The level of granularity, and thus, the efficiency of usage of space at the outside edges of the tank may depend on the size of the individual tank sub-units 20, 20', 20". However, it is to be understood that partial tank sub-units may be used to fill in the edges according to an example of the present disclosure. In the example depicted in FIG. 4, each primary parallelohedron shaped tank sub-unit 20' is a truncated octahedron. Each of the tank sub-units 20, 20', 20" may be in fluid communication with adjacent tank sub-units 20, 20', 20" through aligned orifices/apertures 34 (shown in FIG. 5) in adjacent walls of the tank sub-units 20, 20', 20". In examples wherein the fluid is a liquid, the aligned orifices may be arranged to allow complete drainage of every tank sub-unit under the influence of gravity. It is to be understood that orifices may be in any side of a tank sub-unit with an adjacent tank sub-unit.

Figure 5:
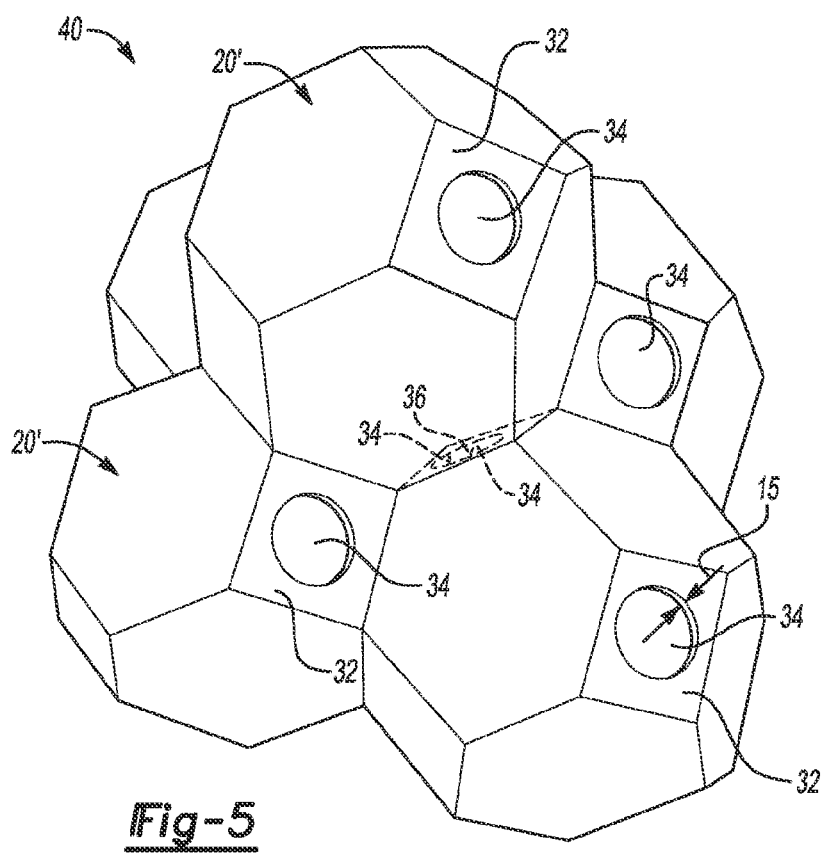
FIG. 5 is a perspective view of an array of truncated octahedron tank sub-units with apertures in square faces according to an example of the present disclosure.

FIG. 5 depicts an array 40 of truncated octahedron tank sub-units 20' with apertures 34 in some of the square faces 32. A wall thickness 15 of a face is depicted in FIG. 5. At reference numeral 36, an aperture 34 is defined in a wall overlapping with another aperture 34 in an adjacent tank sub-unit of the plurality of tank sub-units. Each tank sub-unit 20, 20', 20" has at least one such aperture 34 to provide fluid communication with an adjacent tank sub-unit 20, 20', 20". Some tank sub-units 20, 20', 20" of the present disclosure may have apertures 34 for direct fluid communication with more than one adjacent tank sub-unit 20, 20', 20". All of the tank sub-units 20, 20', 20" in the array 40 are ultimately in fluid communication with all of the other tank sub-units 20, 20', 20" in the array 40. It is to be understood that the fluid to be contained by the array 40 is completely contained within the array 40. In other words, no additional shell is required outside of the array to create a sealed vessel. It is to be understood that although no additional shell is required to seal the vessel, a shell may be used for other reasons including mechanical support, corrosion protection, or visual aesthetic appeal.

Figure 6:
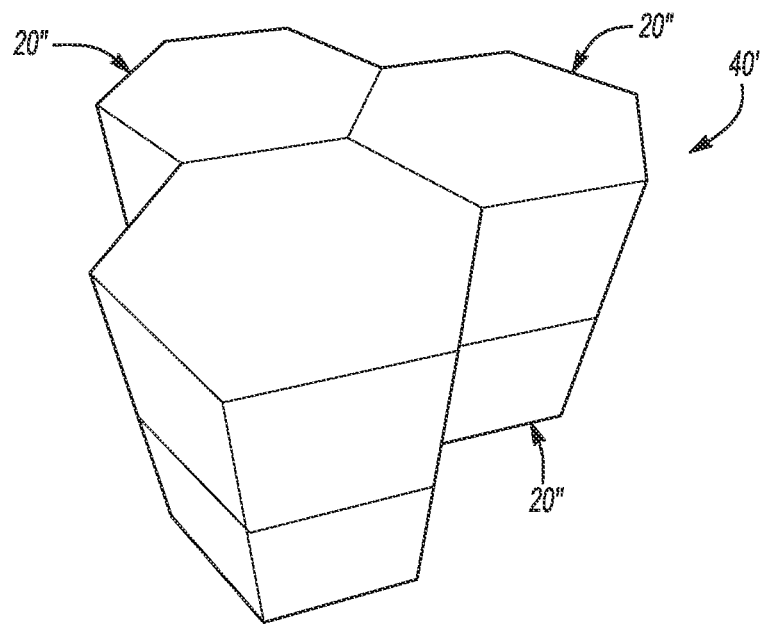
FIG. 6 is a perspective view of an array of hexagonal prism tank sub-units according to a further example of the present disclosure.

In the example depicted in FIG. 6, each primary parallelohedron shaped tank sub-unit in the array 40' is a hexagonal prism 20".

Figure 7:
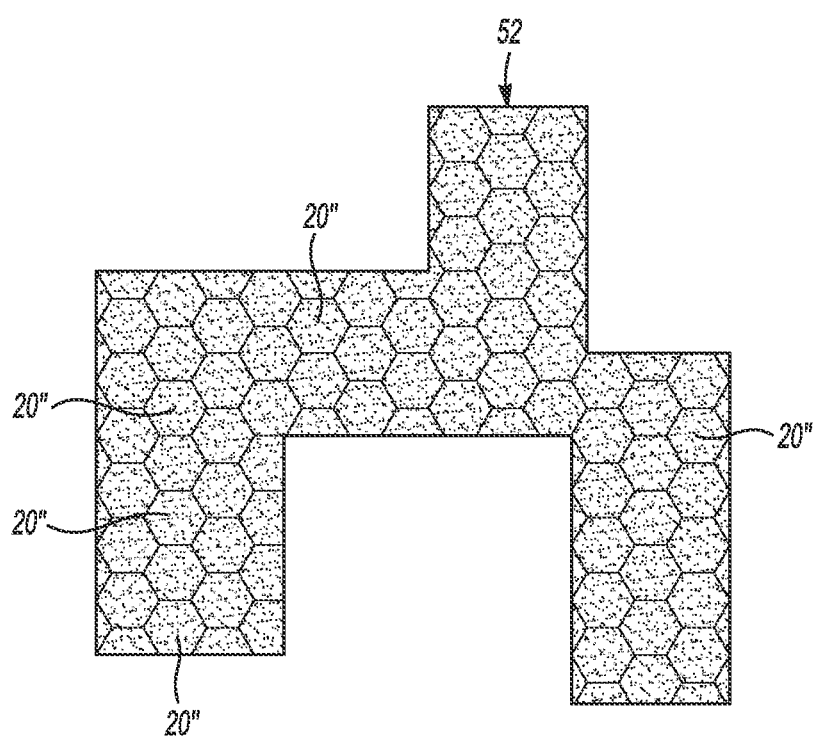
FIG. 7 is a schematic view depicting an array of hexagonal prism tank sub-units tessellated into an irregularly shaped volume according to yet a further example of the present disclosure.

FIG. 7 depicts how hexagonal prism shaped tank sub-units 20" may tessellate a space 52. As such, the space 52 is filled without unused space. As shown in FIG. 7, portions of the hexagonal prism shaped tank sub-units may be used to substantially fill spaces along edges of the space 52 where a whole hexagonal prism shaped tank sub-unit 20" will not fit. The space 52 depicted in FIG. 7 is meant to convey that the space may take any shape.

Further, the tank sub-units 20, 20', 20" in a tank may each have substantially the same shape, and exterior size. In another example, tank sub-units 20, 20', 20" of several sizes, shapes and weights may be combined to form a tank. In examples of the present disclosure, an individual tank sub-unit 20, 20', 20" may have a uniform wall thickness, or portions of the individual tank sub-unit 20, 20', 20" may have thicker walls than other portions. In examples, different tank sub-units 20, 20', 20" may have different wall thicknesses from each other. For example, tank sub-20, 20', 20" on an interior portion of a pressurized tank may be supported by adjacent tank sub-units and experience less stress-inducing force from the pressure of the contained fluid. Tank sub-units 20, 20', 20" on an exterior of the same tank may have thicker walls to reduce the stress caused by the pressurized fluid when the wall does not have an adjacent tank sub-unit acting as a buttress to reduce the net force on the wall.

Although certain shapes have been described above in association with the Figures, tank sub-units 20, 20', 20" of the present disclosure may have other three dimensional shapes that tessellate a volume. For example, tank sub-units in a tank of the present disclosure may include a mixture of irregular dodecahedra with pentagonal faces that possess tetrahedral symmetry. Similarly, tank sub-units may be tetrakaidecahedra with two hexagonal and twelve pentagonal faces possessing antiprismatic symmetry (Weaire-Phelan structures). The tank sub-units may be other space filling geometrical shapes including pyritohedra and hexagonal truncated trapezohedra.

In examples of the present disclosure, smaller tank sub-units 20, 20', 20" may be positioned on exterior layers to make the tank more resistant to a difference in pressure between the tank sub-units 20, 20', 20" and the atmosphere outside of the tank. Smaller tank sub-units would present more stiffening walls to provide strength to resist pressure-induced stress.

In a further example of the present disclosure, adjacent faces of adjacent tank sub-units 20', 20" in the array 40, 40' are mutually affixed and aligned with bilateral symmetry, and a line through centroids of the adjacent faces is orthogonal to each of the adjacent faces of the adjacent tank sub-units 20', 20".

It is to be understood that adjacent tank sub-units 20, 20', 20" may be attached to each other by any suitable method. In an example, the sub-units are welded together. In a further example, the sub-units are adhesively bonded together. It is to be understood that any suitable adhesive may be used, e.g., to provide sufficient bonding for the material from which the sub-units 20, 20', 20" are formed.

The tank sub-unit 20, 20', 20" may be formed from a metal, a polymer, a fiber-reinforced composite, and/or combinations thereof. In each example, the tank sub-units 20, 20', 20" may be made of any material that is suitable for the rated service pressure. In some examples of the present disclosure, for example, a vented liquid storage tank, the service pressure may be relatively low. In other examples, e.g., a gas storage tank, the service pressure may be 3,600 psi or higher.

Some examples of suitable tank sub-unit materials may include aluminum alloys, high strength low alloy steel (HSLA), titanium, and stainless steels. Examples of high strength aluminum alloys include those in the 7000 series, which have relatively high yield strength. One specific example includes aluminum 7075-T6 which has a tensile yield strength of about 73,000 psi (503 MPa (Megapascals)). Other aluminum alloys include those in the 6000 series with one specific example being aluminum 6061-T6 which has a tensile yield strength of about 40,000 psi (276 MPa). The selection of the aluminum alloy to bring about weight reduction will depend on the final vessel design, and thus on the working pressure. Examples of high strength low alloy steel generally have a carbon content ranging from about 0.05% to about 0.25%, and the remainder of the chemical composition varies in order to obtain the desired mechanical properties.

The resistance of the tanks disclosed herein to the pressure results, at least in part, from a balance between a material's yield strength and a thickness of the tank sub-unit walls. Tanks made with high strength materials may be made using thinner stock (sheets) than lower strength materials. As such, high strength tanks may be lighter than tanks made of lower yield strength alloys. In examples of the present disclosure, a tank sub-unit 20, 20', 20" may have walls made from different yield strength alloys in the same tank sub-unit 20, 20', 20". In other examples, a tank sub-unit 20, 20', 20" made from a first material may be in a same array 40, 40' with another tank sub-unit 20, 20', 20" made from a second material. For example, the first material may be a 6000 series aluminum, and the second material may be a 7000 series aluminum.

While not shown, it is to be understood that a tank may be configured with other tanks so that the multiple tanks are in fluid communication through a manifold or other suitable mechanism. Further, at least two tank sub-units 20, 20', 20" of the plurality of tank sub-units 20, 20', 20" may be in fluid communication with a manifold to add and extract the fluid from the at least two tank sub-units in parallel.

In examples that include a natural gas adsorbent 14, the natural gas adsorbent 14 may be positioned within each tank sub-unit 20, 20', 20". Suitable adsorbents 14 are at least capable of releasably retaining methane compounds (i.e., reversibly storing or adsorbing methane molecules). In some examples, the selected adsorbent 14 may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the selected adsorbent 14 may be inert to some of the natural gas components and capable of releasably retaining other of the natural gas components.

In general, the adsorbent 14 has a high surface area and is porous. The size of the pores is generally greater than the effective molecular diameter of at least the methane compounds. In an example, the pore size distribution is such that there are pores having an effective molecular diameter of the smallest compounds to be adsorbed and pores having an effective molecular diameter of the largest compounds to be adsorbed. In another example, the adsorbent 14 has a BET surface area greater than about 50 square meters per gram ($m^2/g$) and up to about 5,000 $m^2/g$, and includes a plurality of pores having a pore size greater than about 2 angstroms and up to about 50 nm.

Examples of suitable adsorbents 14 include carbon (e.g., activated carbons, super-activated carbon, carbon nanotubes, carbon nanofibers, carbon molecular sieves, zeolite template carbons, etc.), zeolites, metal-organic framework (MOF) materials, porous polymer networks, and combinations thereof. Example of suitable zeolites include zeolite X, zeolite Y, zeolite LSX, MCM-41 zeolites, silicoaluminophosphates (SAPOs), and combinations thereof. Examples of suitable metal-organic frameworks include MOF-5, ZIF-8, MOF-177, and/or the like, which are constructed by linking inorganic clusters with organic linkers (for example, carboxylate linkers).

The volume that the adsorbent 14 occupies in the container will depend upon the density of the adsorbent 14. In an example, it is desirable that the density of the adsorbent 14 range from about 0.1 g/cc (grams per cubic centimeter) to about 0.9 g/cc. A well packed adsorbent 14 may have a density of about 0.5 g/cc. In an example, a container may include 100 pounds (45,359 g) of a carbon adsorbent 14. In this example, 10% of the adsorbent 14 amounts to about 10 pounds (4535.9 g) of buffer natural gas that is left in the container at 1 atmosphere (14.7 psi). The release of this amount of gas would significantly improve the vehicle mileage.

The adsorbent 14 selected (i.e., type, density, etc.) may also depend upon the operation conditions (e.g., temperature, pressure, etc.).

While some examples of the tanks disclosed herein have been described as being for a vehicle, it is to be understood that examples of the present disclosure may be used in other, non-automotive applications that utilize or transport a stored fluid.

It is to be understood that the ranges provided herein include the stated range and any value or sub-range within the stated range. For example, a range from about 0.1 g/cc to about 0.9 g/cc should be interpreted to include not only the explicitly recited limits of about 0.1 g/cc to about 0.9 g/cc, but also to include individual values, such as 0.25 g/cc, 0.49 g/cc, 0.8 g/cc, etc., and sub-ranges, such as from about 0.3 g/cc to about 0.7 g/cc; from about 0.4 g/cc to about 0.6 g/cc, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A fluid storage tank, comprising:
   a plurality of tank sub-units disposed in an array wherein:

each tank sub-unit of the plurality of tank sub-units is a primary parallelohedron;

each tank sub-unit of the plurality of tank sub-units has substantially the same shape and exterior size;

the array of tank sub-units is tessellated into a three-dimensional volume;

each tank sub-unit of the plurality of tank sub-units has an aperture defined in at least one wall overlapping with an other aperture defined in at least one adjacent tank sub-unit of the plurality of tank sub-units;

each tank sub-unit of the plurality of tank sub-units is in fluid communication with a single outlet port for selectively extracting the fluid from the tank; and each tank sub-unit of the plurality of tank sub-units is in fluid communication with a single fluid fill port.

2. The fluid storage tank as defined in claim 1, further comprising a natural gas adsorbent disposed in each tank sub-unit of the plurality of tank sub-units in the array.

3. The fluid storage tank as defined in claim 2 wherein the natural gas adsorbent is selected from carbon, a porous polymer network, a metal organic framework, or a zeolite.

4. The fluid storage tank as defined in claim 1 wherein the single outlet port is the single fluid fill port.

5. The fluid storage tank as defined in claim 1 wherein at least two tank sub-units of the plurality of tank sub-units are in fluid communication with a manifold to add and extract the fluid from the at least two tank sub-units in parallel.

6. The fluid storage tank as defined in claim 1 wherein each tank sub-unit has an internal volume ranging from about 0.2 liter to about 3.0 liters.

7. The fluid storage tank as defined in claim 1 wherein a face of at least one tank sub-unit has a wall thickness greater than that of an other face of the at least one tank sub-unit.

8. The fluid storage tank as defined in claim 1 wherein a face of at least one tank sub-unit is formed from a material having a yield strength greater than the yield strength of an other material formed into an other face of the at least one tank sub-unit.

9. The fluid storage tank as defined in claim 1 wherein a wall thickness of a tank sub-unit having a uniform wall thickness is greater than an other wall thickness of an other tank sub-unit.

10. The fluid storage tank as defined in claim 1, further comprising:
a first tank sub-unit formed from a first material; and
a second tank sub-unit formed from a second material wherein a yield strength of the first material is greater than a yield strength of the second material.

11. The fluid storage tank as defined in claim 1 wherein adjacent faces of adjacent tank sub-units in the array are mutually affixed and aligned with bilateral symmetry, and wherein a line through centroids of the adjacent faces is orthogonal to each of the adjacent faces of the adjacent tank sub-units.

12. The fluid storage tank as defined in claim 11 wherein the adjacent tank sub-units are welded together.

13. The fluid storage tank as defined in claim 11 wherein the adjacent tank sub-units are adhesively bonded together.

14. The fluid storage tank as defined in claim 1 wherein each tank sub-unit of the plurality of tank sub-units is a truncated octahedron.

15. The fluid storage tank as defined in claim 14 wherein the aperture is defined in a square face of the truncated octahedron.

16. The fluid storage tank as defined in claim 1 wherein each tank sub-unit of the plurality of tank sub-units is a hexagonal prism.

* * * * *